United States Patent
Yoon et al.

(10) Patent No.: US 7,449,804 B2
(45) Date of Patent: Nov. 11, 2008

(54) STATOR OF RECIPROCATING MOTOR

(75) Inventors: Sun-Ki Yoon, Busan (KR); Won-Hyun Jung, Gyeongsangnam-do (KR)

(73) Assignee: LG Electronics Inc., Seoul (KR)

(*) Notice: Subject to any disclaimer, the term of this patent is extended or adjusted under 35 U.S.C. 154(b) by 146 days.

(21) Appl. No.: 10/547,934

(22) PCT Filed: Mar. 11, 2004

(86) PCT No.: PCT/KR2004/000505

§ 371 (c)(1), (2), (4) Date: Sep. 8, 2005

(87) PCT Pub. No.: WO2004/082101

PCT Pub. Date: Sep. 23, 2004

(65) Prior Publication Data

US 2006/0192441 A1 Aug. 31, 2006

(30) Foreign Application Priority Data

Mar. 11, 2003 (KR) .................. 10-2003-0015208

(51) Int. Cl.
H02K 33/00 (2006.01)
(52) U.S. Cl. ............... 310/15; 310/12; 310/13; 310/14; 417/417
(58) Field of Classification Search ............ 310/15, 310/12, 14, 194; 417/417, 416, 418
See application file for complete search history.

(56) References Cited

U.S. PATENT DOCUMENTS

| | | | | |
|---|---|---|---|---|
| 2,872,101 A * | 2/1959 | Ryba | ............ | 417/418 |
| 3,774,059 A | 11/1973 | Cox | | |
| 4,882,514 A * | 11/1989 | Brynsvold et al. | ........... | 310/208 |
| 5,300,845 A * | 4/1994 | Fanning et al. | ............. | 310/217 |
| 5,318,412 A * | 6/1994 | Laskaris et al. | ............. | 417/417 |
| 5,907,201 A * | 5/1999 | Hiterer et al. | ................. | 310/30 |
| 5,945,748 A * | 8/1999 | Park et al. | ...................... | 310/12 |
| 6,077,054 A * | 6/2000 | Lee et al. | ..................... | 417/417 |
| 6,084,320 A * | 7/2000 | Morita et al. | ................. | 310/12 |
| 6,454,548 B2 * | 9/2002 | Falk et al. | ................... | 417/417 |
| 6,917,127 B2 * | 7/2005 | Hong et al. | .................... | 310/14 |
| 7,323,800 B2 * | 1/2008 | Lee et al. | ..................... | 310/218 |
| 2002/0105247 A1 | 8/2002 | Park | | |
| 2003/0137209 A1 * | 7/2003 | Do et al. | ..................... | 310/194 |

FOREIGN PATENT DOCUMENTS

| JP | 2001-352737 A | 12/2001 |
|---|---|---|
| WO | WO 0173923 A2 * | 10/2001 |
| WO | WO-02/087059 A1 | 10/2002 |

* cited by examiner

Primary Examiner—Burton Mullins
Assistant Examiner—Alex W Mok
(74) Attorney, Agent, or Firm—Birch, Stewart, Kolasch & Birch, LLP

(57) ABSTRACT

A stator of a reciprocating motor includes a ring-shaped bobbin including a winding coil 400 therein; a plurality of unit laminated assemblies each constructed of a plurality of lamination sheets and coupled to the bobblin in a circumferential direction; a fixing means integrally formed with the bobbin and for fixing the unit laminated assemblies to the bobbin; and an inner core inserted in an outer core at a certain interval between itself and a round inner circumferential surface formed by inner surface of the unit laminated assemblies, so that components can be easily assembled, the number of assembling processes and the number of components can be reduced.

17 Claims, 5 Drawing Sheets

[Fig. 1]
Prior Art
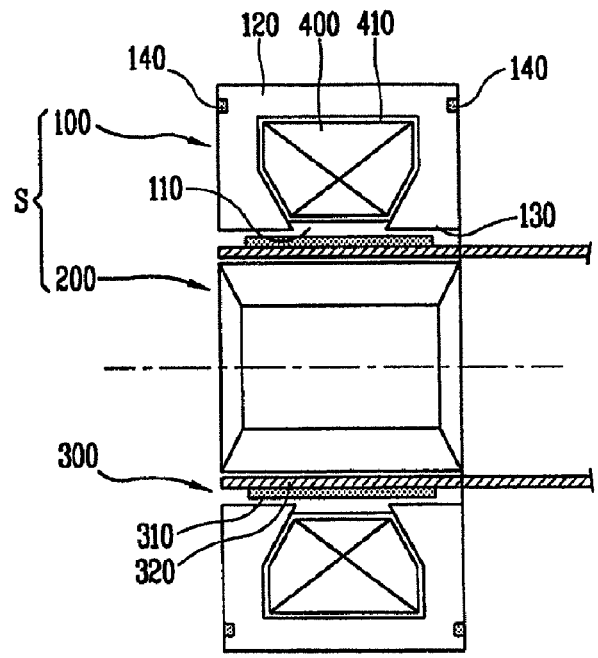
[Fig. 2]
Prior Art
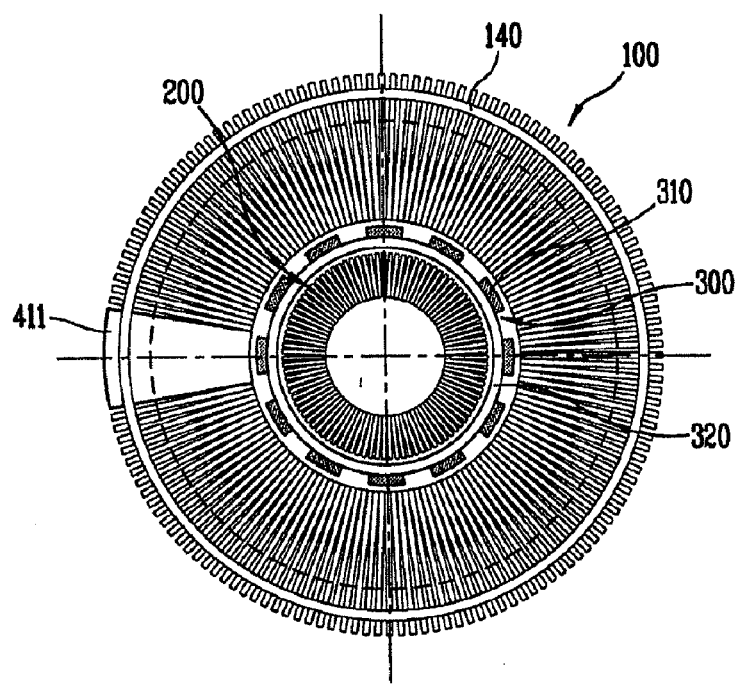

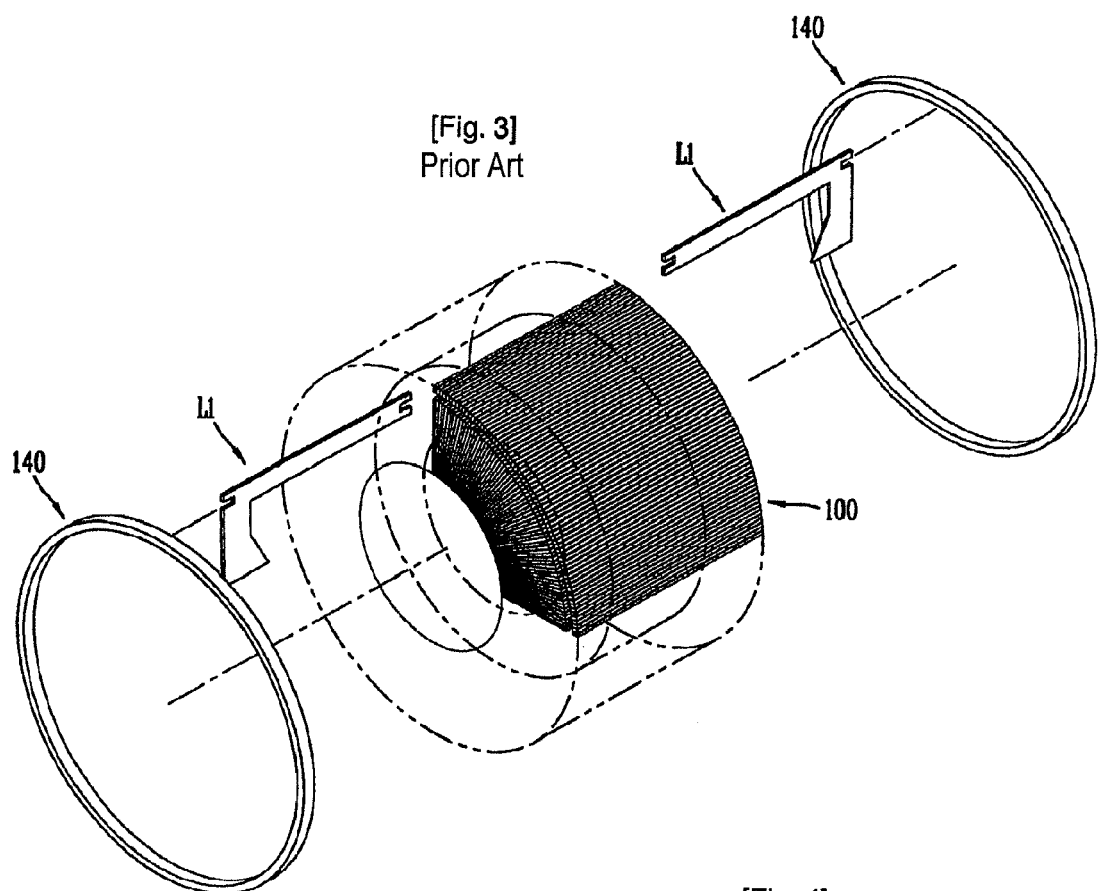
[Fig. 3]
Prior Art
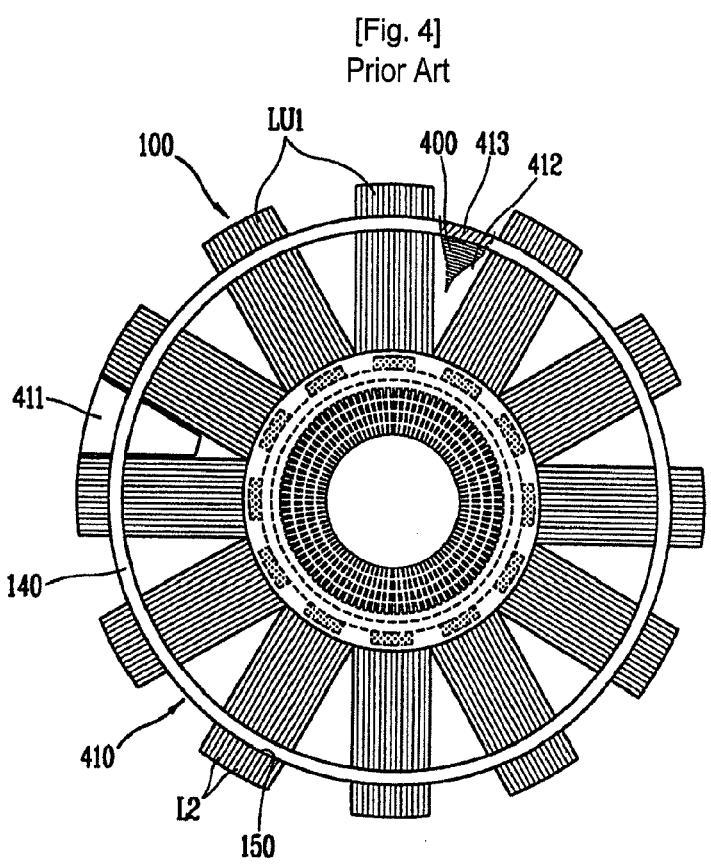
[Fig. 4]
Prior Art

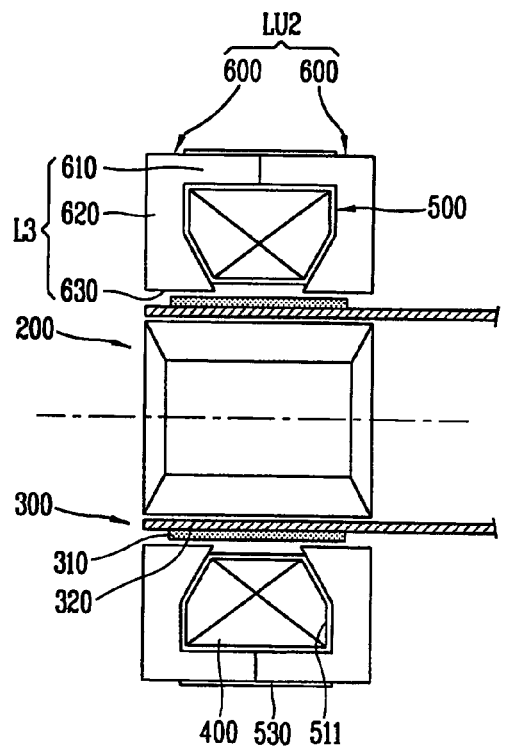
[Fig. 5]
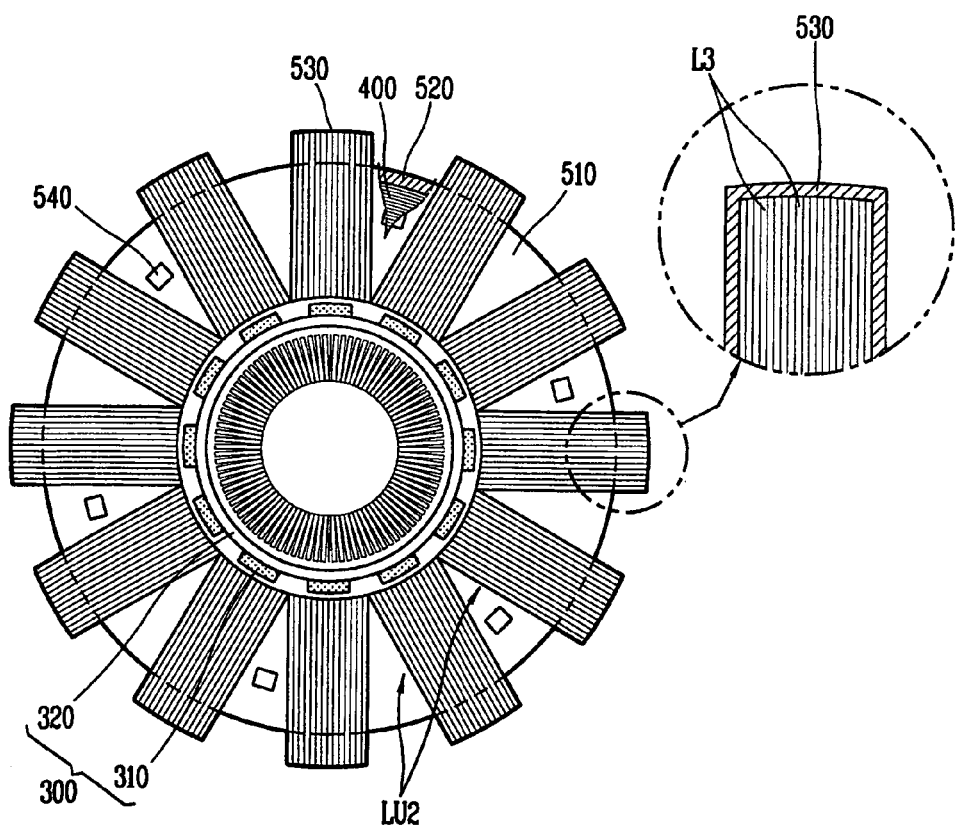
[Fig. 6]

[Fig. 7]
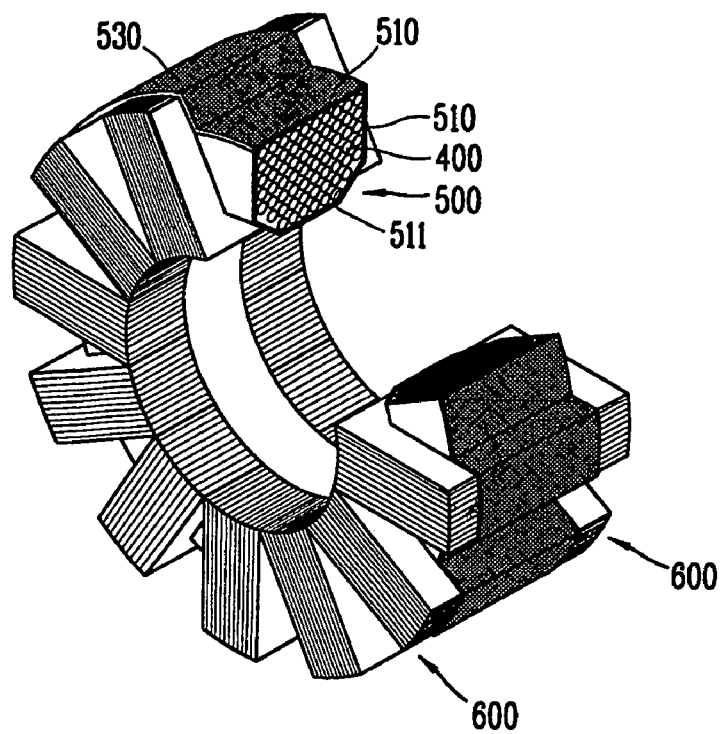
[Fig. 8]
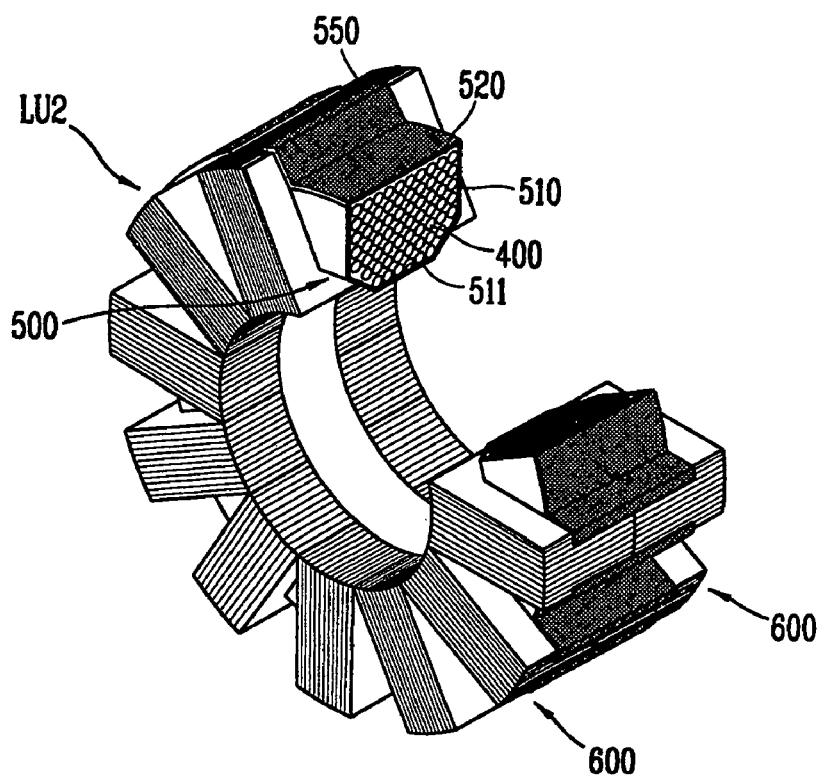

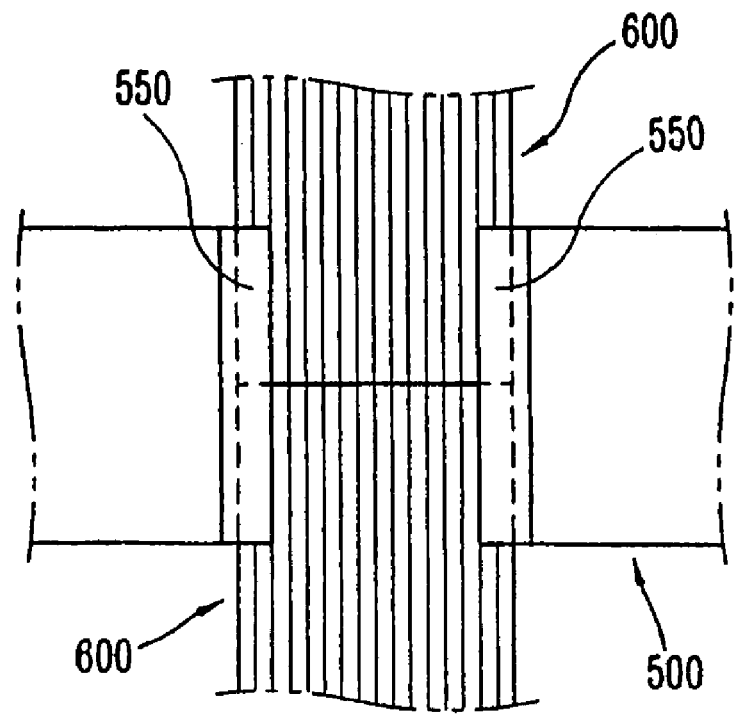
[Fig. 9]
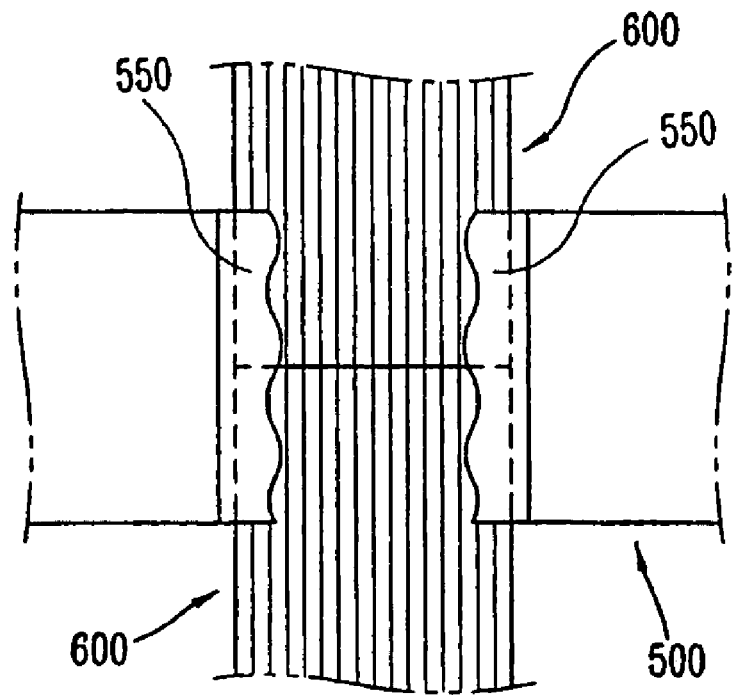
[Fig. 10]

STATOR OF RECIPROCATING MOTOR

TECHNICAL FIELD

The present invention relates to a reciprocating motor, and particularly, to a stator of a reciprocating motor capable of reducing the number of components and the number of assembling processes and also reducing dimensional errors of components in assembling.

BACKGROUND ART

A motor converts electric energy into kinetic energy. The motor is classified into a rotating motor that converts electric energy to a rotational movement force and a reciprocating motor that converts electric energy to a linear movement force.

FIGS. 1, 2 illustrate one embodiment of the reciprocating motor. As shown therein, the reciprocating motor includes a stator (S) including an outer core 100 and an inner core 200 inserted in the outer core 100; and a mover 300 movably inserted between the outer core 100 and the inner core 200 of the stator. The mover 300 includes a permanent magnet 310 and a magnet holder 320 supporting the permanent magnet 310. A winding coil 400 and a bobbin 510 around which the winding coil 400 is wound are coupled to the inside of the outer core 100, and the winding oil 400 may be coupled to the inner core 200.

The outer core 100 is formed in a cylindrical shape having a certain diameter and has a certain width. When viewed in a circumferential direction, the outer core 100 includes an opening groove 110 inwardly opened so that the winding coil 400 and the bobbin 410 are positioned therein; a pass portion 120, an outer side of the opening groove 110, through which a flux flows; and pole portions 130, both end portions of the pass portion 120, for forming poles.

The inner core 200 is formed in a cylindrical shape having a certain width. When viewed in a circumferential direction, the inner core 200 has a rectangular shape having certain width and a certain length.

The bobbin 410 is formed in a ring shape, and the winding oil 400 is made such that a wire is wound around the bobbin 410 plural times.

Non-explained reference numerals 411, 140 are a terminal part and a fixing ring, respectively.

Operations of the reciprocating motor will now be described.

When power is applied to the reciprocating motor, a current flows through the winding coil 400, and a flux is formed around the winding coil 400 by the current flowing through the winding coil 400. The flux formed around the winding coil 400 forms a closed loop along the pass portion 120 of the outer core and the inner core 200.

By interaction between the flux formed along the pass portion 120 of the outer core and the inner core 200 by the current flowing through the winding coil 400 and the permanent magnet 310 of the mover, a force is applied to the permanent magnet 310 in an axial direction. The permanent magnet 310 and the magnet holder 320 are moved in an axial direction by the force applied to the permanent magnet 310. And, a direction of the current supplied to the winding coil 400 is alternatively changed, thereby linearly reciprocating the mover 300.

The outer core 100 and the inner core 200 constituting the stator (S) are various in shapes and in their production method. In order to minimize loss of flux, the outer core 100 and the inner core 200 of the stator are usually fabricated by stacking a plurality of thin plates having a prescribed shape.

FIG. 3 is a perspective view showing a disassembled outer core of the stator.

As shown therein, the outer core 100 is made such that a plurality of lamination sheets (L1) having a prescribed shape is stacked at a ring-shaped bobbin 410, and fixing rings 140 are respectively coupled to both sides of a laminated assembly. The lamination sheets (L1) are radially and alternatively stacked to the bobbin 410. The laminated assembly is formed in a cylindrical shape.

Such an outer core 100 of the stator is made as a plurality of lamination sheets (L1) is radially and alternatively stacked so as to have a ring shape, and fixing rings 140 are coupled to both sides of the laminated assembly. Accordingly, it is difficult to assemble the outer core and it takes much time to assemble the outer core, thereby deteriorating its productivity.

FIG. 4 illustrates another embodiment of the stator.

As shown therein, the outer core of the stator is made such that a unit laminated assembly (LU1) with a certain thickness is constructed of a plurality of lamination sheets (L2), the unit laminated assemblies (LU1) are radially coupled to a ring-shaped bobbin 410, and fixing rings 140 are respectively coupled to both sides of the plurality of unit laminated assemblies (LU1).

An inner surface and an outer surface of the unit laminated assembly (LU1) are formed curved by a plurality of lamination sheets 12. The inner surfaces of the unit laminated assemblies (LU1) coupled to the bobbin 410 form a circle, and their outer surfaces are spaced apart from each other, maintaining certain intervals therebetween.

The bobbin 410 includes a ring-shaped body 412 having a ring-shaped winding groove (not shown) in a circumferential direction therein, and a ring-shaped Over 413 for covering the winding groove of the ring-shaped body 412. The winding oil 400 is positioned in the winding groove of the ring-shaped body 412, and a terminal part 411 is formed at one side of the ring-shaped body 412.

Such a structure is relatively easy to assemble as compared to the above-mentioned ring-shaped outer core 100, since unit laminated assemblies (LU1) are coupled to the bobbin 410.

However, such an outer core of the stator is made such that the unit laminated assembly (LU1) is coupled to the bobbin 410, and then ring-shaped fixing rings 140 are respectively coupled to both sides of unit laminated assemblies (LU1). Thus, it is not easy to finely fabricate the fixing rings 140, and an assembling operation of making the fixing rings 140 fixedly coupled to both sides of the unit laminated assemblies (LU1) becomes complicated and difficult. That is, a ring groove 150 formed at the unit laminated assembly (LU1), in which the fixing ring 140 is coupled, is formed by grooves formed at each lamination sheet (L2) constructing the unit laminated assembly (LU1). At this time, it is complicated and difficult to form grooves at each lamination sheet 12 and make the fixing ring 140 coupled to the grooves, thereby deteriorating assembly productivity.

DISCLOSURE

Therefore, it is an object of the present invention to provide a stator of a reciprocating motor capable of reducing the number of components and the number of assembling processes.

It is another object of the present invention to provide a stator of a reciprocating motor capable of reducing a dimensional error of a component in assembling and simplifying assembling operation.

To achieve the above object, there is provided a stator of a reciprocating motor including a ring-shaped bobbin including a winding oil therein; a plurality of unit laminated assemblies each constructed of a plurality of lamination sheets and coupled to the bobbin in a circumferential direction; a fixing means integrally formed with the bobbin and for fixing the unit laminated assemblies to the bobbin; and an inner core inserted in an outer core at a certain interval from a round inner circumferential surface formed by inner surfaces of the unit laminated assemblies.

DESCRIPTION OF DRAWINGS

FIGS. 1, 2 are a sectional view and a front view showing a general reciprocating motor, respectively;

FIG. 3 is a perspective view showing a disassembled stator of a reciprocating motor in accordance with one embodiment of the conventional art;

FIG. 4 is a front view showing a stator of a reciprocating motor in accordance with another embodiment of the conventional art;

FIGS. 5, 6 are a sectional view and a front view showing a reciprocating motor having stator in accordance with one embodiment of the present invention;

FIG. 7 is a perspective view showing partially cutout stator of the reciprocating motor;

FIG. 8 is a perspective view showing a partially cutout stator of a reciprocating motor in accordance with another embodiment of the present invention; and FIGS. 9, 10 are plane views respectively showing a part-fixing portion constituting a stator of the reciprocating motor.

MODE FOR INVENTION

Hereinafter, a stator of a reciprocating motor in accordance with the present invention will now be described in detail with reference to embodiments shown in accompanying drawings.

FIGS. 5, 6 are a sectional view and a front view showing a reciprocating motor having a stator in accordance with one embodiment of the present invention, and FIG. 7 is a perspective view showing a partially cutout stator of the reciprocating motor. The same reference numerals are given to the same parts as the conventional art.

As shown therein, the reciprocating motor includes a ring-shaped bobbin 500 providing a winding coil 400 therein; a plurality of unit laminated assemblies (LU2) each constructed by stacking a plurality of lamination sheets and coupled to the bobbin 500 in a circumferential direction; a fixing means integrally formed with the bobbin 500 and fixing the unit lamination sheets (LU2) to the bobbin 500; an inner core 200 inserted in an outer core at a certain interval between itself and a round inner circumferential surface formed by inner surfaces of the unit laminated assembly (LU2); and a mover 300 movably inserted between the unit laminated assembly (LU2) and the inner core 200.

The unit laminated assembly (LU2) is constructed of two half-unit laminated assemblies 600 which are formed to be symmetric to each other on the reference to a horizontal direction (circumferential direction) of the bobbin 500. Preferably, the lamination sheets constructing the half-unit laminated assemblies 600 are formed in the same shape.

The unit laminated assembly (LU2) may not be separated in two but be formed integrally, and may be implemented variously in shape.

A lamination sheet constructing the half-unit laminated assembly 600 includes a half pass portion 610 having a certain width and a certain length; a side pass portion 620 formed extended from the half pass portion 610, bent at a right angle; and a pole portion 630, an end portion of the side pass portion 620.

The shape of the pole portion 630, an end portion of the side pass portion 620, may be implemented variously in shape.

The half-unit laminated assemblies 600 are positioned at the bobbin 500 with end portions of the half pass portions 610 contacted to each other, and the two half-unit laminated assemblies 600 construct one unit laminated assembly (LU2).

The bobbin 500 includes a ring-shaped body portion 510 having a ring-shaped winding groove 511 in which a winding coil is positioned; a covering portion 520 for covering the winding groove 511 of the ring-shaped body portion; and a totally-fixing portion 530 formed extended from the covering portion 520 and for fixing the unit laminated assembly (LU2) to the bobbin by covering an entire outer surface of the unit laminated assembly (LU2).

The totally-fixing portion 530 of the bobbin is the fixing means.

The bobbin 500 is made of a molding material having an insulating property.

The winding coil 400 is made as a wire is wound plural times around the ring-shaped body portion 510 of the bobbin.

The covering portion 520 is formed in a ring shape with a certain thickness and a certain width, and the width of the covering portion 520 is formed to be the same as that of the ring-shaped body portion 510.

The unit laminated assembly (LU2) is formed as two separated half-unit laminated assemblies 600 are coupled to the bobbin 500 so that ends of the half pass portions 610 of the half-unit lamination assemblies are contacted to each other. Then, an inner side of the half pass portion 610 of the laminated assembly 600 comes in contact with the covering portion 520 of the bobbin 500, and an inner side of the side pass portion 620 comes in contact with a side surface of the ring-shaped body portion 510 of the bobbin. That is, the unit laminated assembly (LU2) is coupled to the bobbin, making the lamination sheets (L3) constructing the unit laminated assembly (LU2) face the center of the bobbin.

The totally-fixing portion 530 of the bobbin has a certain thickness and is formed in a band shape a width of which is the same as that of the covering portion 520. The totally-fixing portion 530 covers a portion where two half-unit laminated assemblies 600 constructing the unit laminated assembly (LU2) (a half pass portion of the laminated sheet) are in contact with each other. At this time, both surfaces and outer surface of the unit laminated assembly (LU2) are adhered to the totally-fixing portion 530, and the totally-fixing portion 530 is protruded.

A plurality of discharge openings 540 through which moisture is discharged is formed at the ring-shaped body portion 510 of the bobbin.

The plurality of unit laminated assemblies (LU2) is fixedly coupled to the bobbin 500 by totally-fixing portions 530, respectively.

FIG. 8 illustrates another embodiment of the fixing means. The same reference numerals are given to the same part as in the above embodiment.

As shown therein, the fixing means is formed extended from a covering portion 520 of the bobbin 500 and includes a partially fixing portion 550 for fixing the unit laminated assembly (LU2) to the bobbin by covering parts of both sides of the unit laminated assembly (LU2).

The partially-fixing portions 550 for respectively fixing both sides of the unit laminated assembly (LU2) to the bobbin are formed in the same shape.

The partially-fixing portion 550 has a certain thickness and a certain width, and its width is the same as that of the covering portion 520 of the bobbin.

The partially-fixing portion 550 covers one side surface of the unit laminated assembly (LU2) and a part of its outer circumferential surface. And an inner surface of the partially-fixing portion 550 is adhered to one side surface of the unit laminated assembly (LU2) and its outer circumferential surface. The partially-fixing portion 550 is protruded from the unit laminated assembly (LU2).

Preferably, the partially-fixing portion 550 covers ⅓ of an outer surface of the unit laminated assembly (LU2).

In addition, as shown in FIG. 9, ends of partially-fixing portions 550 that fix both sides of the unit laminated assembly (LU2) are formed to be straight.

As a different modified example of the partially-fixing portion, as shown in FIG. 10, ends of partially-fixing portions 550 that fix both sides of the unit laminated assembly (LU2) are formed to be curved, and the curved lines of the two partially-fixing portions 550 are formed to be symmetric to each other.

The bobbin 500 provided with the partially-fixing portion 550 is made of a molding material having an insulating property.

If the partially-fixing portion 550 is formed by over-molding, its deformation due to a constriction caused by cooling can be prevented, which may occur in the totally-fixing portion 530.

The inner core 200 is formed in a cylindrical shape having a certain width. The inner core 200 is a laminated assembly constructed of a plurality of quadrangular shaped lamination sheets having a certain width and a certain length.

One example of a method for fabricating a stator of a reciprocating motor as above will now be described.

First of all, a plurality of unit laminated assemblies (LU2) is coupled to a bobbin 500 in which a winding oil 400 is positioned. At this time, a totally-fixing portion 530 or a partially-fixing portion 550 have not been made at the bobbin yet. The unit laminated assembly (LU2) is constructed of two half-unit laminated assemblies 600, and the two half-unit laminated assemblies 600 are coupled to the bobbin 500 so as to be in contact with each other. Inner surfaces of the lamination sheets (L3) constructing the laminated assembly 600 come in contact with the covering portion 520 of the bobbin, and inner surfaces of the side pass portions 620 of the lamination sheets come in contact with a side surface of the bobbin 500. The inner surfaces of the unit laminated assemblies (LU2) coupled to the bobbin 500 form an inner circumferential surface of a cylindrical shape.

A molding material having an insulating property is over-molded on the bobbin and the plurality of unit laminated assemblies. The totally-fixing portion, the fixing means, means the molding material particularly covering the unit laminated assembly When partially-fixing portions 550, the fixing means, are formed, a molding material is over-molded only on a part of both sides of the unit laminated assembly (LU2).

Then, the molding material is cooled.

Hereinafter, operational effect of a stator of a reciprocating motor in accordance with the present invention will now be described.

In the stator of the reciprocating motor in accordance with the present invention, a plurality of unit laminated assemblies (LU2) coupled to the bobbin 500 is fixedly coupled to the bobbin 500 by extendedly forming one side of the bobbin 500. Accordingly the number of components is relatively reduced, and an assembly process is simplified.

That is, in the conventional art, ring grooves 150 are formed at each unit laminated assembly (LU2), and a round-shaped fixing ring 140 is inserted in the ring groove 150 by compressing the fixing ring 140. Therefore, a dimension of the ring groove 150 and that of the fixing ring 140 must be made so as to fit to each other, thereby making fabrication complicated and requiring relatively many components. However, in the present invention, there is no need for a ring groove 150 of a unit laminated assembly (LU2) and a fixing ring 140.

In addition, in the present invention, deformation of a dimension of a unit laminated assembly (LU2) constructed of a plurality of lamination sheets (L3) is minimized, so that a gap between the outer core and the inner core, in which a mover 300 is inserted, is constantly maintained.

Especially, since the present invention has a structure which can be produced by an over-molding, when a plurality of unit laminated assemblies (LU2) is fixed to the bobbin by an over-molding, an assembling time is shortened and the number of assembling processes is reduced.

As so far described, in a stator of a reciprocating motor in accordance with the present invention is produced, components are easily assembled, and the number of assembling processes and the number of components are relatively reduced, thereby improving assembling productivity, reducing fabrication cost, and thus strengthening the competitiveness of the product.

Also, in the present invention, since a dimensional error of a component is reduced in assembling, thereby improving reliability of a product.

It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A stator of a reciprocating motor comprising:
   an outer core formed in a ring shape and providing a winding coil therein; and
   an inner core formed in a ring shape, and inserted in an outer core at a certain interval, wherein the outer core includes:
   a bobbin having an opened outer circumferential surface so that the winding coil can be wound therein;
   a plurality of unit laminated assemblies coupled to the bobbin in a circumferential direction; and
   a molding material for covering an outer circumferential surface of the bobbin, and fixing both lateral surfaces and an outer circumferential surface of each of the unit laminated assemblies by encompassing along a circumferential direction of the bobbin.

2. The stator of claim 1, wherein the unit laminated assembly comprises two half-unit laminated assemblies symmetric to each other on the reference to a horizontal direction of the bobbin, and a contact portion between the two half-unit laminated assemblies is covered by the molding material.

3. The stator of claim 2, wherein the lamination sheet for constructing the half-unit laminated assembly comprises a half pass portion having a certain width and a certain length;

a side pass portion formed extended from the half pass portion, bent at a right angle; and a pole portion, an end portion of the side pass portion.

4. The stator of claim 1, wherein a plurality of discharge openings through which moisture is discharged are formed at one side of the bobbin.

5. The stator of claim 1, wherein a plurality of discharge openings through which moisture is discharged are formed at one side of the bobbin.

6. A stator of a reciprocating motor comprising:

an outer core formed in a ring shape and providing a winding coil therein; and an inner core formed in a ring shape, and inserted in an outer core with a certain interval, wherein the outer core includes:

a bobbin having a winding groove of a ring shape so that the winding coil can be wound therein, and having an opening on an outer circumferential surface thereof;

a plurality of unit laminated assemblies composed of two half-unit laminated assemblies symmetric to each other and assembled on the reference to a horizontal direction of the bobbin, and coupled to the bobbin in a circumferential direction; and a molding material for covering an opening of the bobbin, and fixing the assembled part between the two half-unit laminated assemblies by encompassing along a circumferential direction of the bobbin, wherein the molding material includes a covering portion that covers the opening of the body, and a fixing portion integrally formed with the covering portion and fixing the unit laminated assemblies by encompassing, and wherein the fixing portion fixes entire lateral sidewalls and an entire outer circumferential surface of each of the unit laminated assemblies by encompassing.

7. The stator of claim 6, wherein a width of the fixing portion is the same as that of the covering portion.

8. The stator of claim 6, wherein the bobbin is made of a molding material having an insulating property.

9. A stator of a reciprocating motor comprising:

an outer core formed in a ring shape and providing a winding coil therein; and an inner core formed in a ring shape, and inserted in an outer core with a certain interval, wherein the outer core includes:

a bobbin having a winding groove of a ring shape so that the winding coil can be wound therein, and having an opening on an outer circumferential surface thereof;

a plurality of unit laminated assemblies composed of two half-unit laminated assemblies symmetric to each other and assembled at two sides on the reference to a horizontal direction of the bobbin, and coupled to the bobbin in a circumferential direction; and a molding material for covering an opening of the bobbin, and fixing the assembled part between the two half-unit laminated assemblies by encompassing along a circumferential direction of the bobbin, wherein the molding material includes a covering portion that covers the opening of the body, and a partially-fixing portion integrally formed with the covering portion and fixing the unit laminated assemblies by encompassing, and wherein the partially-fixing portion fixes entire lateral sidewalls and a part of the outer circumferential surface of each of the unit laminated assemblies by encompassing.

10. The stator of claim 9, wherein the partially-fixing portion covers ⅓ of an outer circumference of the unit laminated assembly.

11. The stator of claim 9, wherein ends of the partially-fixing portions for respectively fixing both sides of the unit laminated assembly are straight.

12. The stator of claim 9, wherein ends of the partially-fixing portions for respectively fixing both sides of the unit laminated assembly are curved.

13. The stator of claim 12, wherein the curved lines of partially-fixing portions respectively positioned at both sides of the unit laminated assembly are are symmetric to each other.

14. The stator of claim 9, wherein widths of the partially-fixing portions respectively positioned at both sides of the unit laminated assembly are the same as that of the covering portion.

15. The stator of claim 9, wherein the bobbin is made of a molding material having an insulating property.

16. The stator of claim 9, wherein the partially-fixing portions for respectively fixing both sides of the unit laminated assembly are the same in shape.

17. The stator of claim 9, wherein a plurality of discharge openings through which moisture is discharged is formed at one side of the bobbin.

* * * * *